United States Patent
Delso Gafarot

(10) Patent No.: US 11,688,044 B2
(45) Date of Patent: Jun. 27, 2023

(54) SYSTEMS AND METHODS OF VALIDATING MOTION CORRECTION OF MEDICAL IMAGES FOR QUANTITATIVE PARAMETRIC MAPS

(71) Applicant: GE PRECISION HEALTHCARE LLC, Wauwatosa, WI (US)

(72) Inventor: Gaspar Delso Gafarot, Barcelona (ES)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 234 days.

(21) Appl. No.: 17/168,835

(22) Filed: Feb. 5, 2021

(65) Prior Publication Data

US 2022/0253987 A1    Aug. 11, 2022

(51) Int. Cl.
*G06T 5/00*    (2006.01)

(52) U.S. Cl.
CPC .... *G06T 5/003* (2013.01); *G06T 2207/10016* (2013.01); *G06T 2207/10088* (2013.01); *G06T 2207/20201* (2013.01); *G06T 2207/30168* (2013.01)

(58) Field of Classification Search
CPC ...................... G06T 5/003; G06T 2207/10088
USPC ........................................................ 382/131
See application file for complete search history.

(56) References Cited

U.S. PATENT DOCUMENTS

| | | |
|---|---|---|
| 7,643,670 B2 | 1/2010 | Leach et al. |
| 9,129,424 B2 | 9/2015 | Xue et al. |
| 10,605,880 B2 | 3/2020 | Bi et al. |
| 2004/0167395 A1 | 8/2004 | Behrenbruch et al. |
| 2009/0276245 A1 | 11/2009 | Cziria et al. |
| 2011/0148928 A1 | 6/2011 | Gopalakrishnan et al. |

(Continued)

FOREIGN PATENT DOCUMENTS

| | | |
|---|---|---|
| DE | 102014204411 A1 | 9/2015 |
| IN | 201500498 I4 | 8/2016 |

OTHER PUBLICATIONS

D. Messroghli et al., "Clinical recommendations for cardiovascular magnetic resonance mapping of T1, T2, T2* and extracellular volume: A consensus statement by the Society for Cardiovascular Magnetic Resonance (SCMR) endorsed by the European Association for Cardiovascular Imaging (EACVI)", Journal of Cardiovascular Magnetic Resonance, Oct. 9, 2017, BioMed Central, DOI 10.1186/s12968-017-0389-8, 24 pages.

*Primary Examiner* — Ayodeji O Ayotunde
(74) *Attorney, Agent, or Firm* — Armstrong Teasdale LLP

(57) ABSTRACT

A computer-implemented method of validating motion correction of magnetic resonance (MR) images in a quantitative parametric map of a parameter is provided. The method includes receiving a series of motion corrected images of a series of MR images, wherein the series of MR images are MR images of an anatomical region at different points of time. For each pixel of a plurality of pixels in one of the series of motion corrected images, the method further includes generating a time series at the pixel based on the series of motion corrected images, fitting the time series to a model of the parameter, and estimating an indicator of goodness of fit of the time series to the model. The method also includes generating a metric indicating effectiveness of the motion correction based on estimated indicators of goodness of fit of the plurality of pixels, and validating the motion correction based on the metric.

20 Claims, 5 Drawing Sheets
(1 of 5 Drawing Sheet(s) Filed in Color)

(56) References Cited

U.S. PATENT DOCUMENTS

2012/0010513 A1\* 1/2012 Wong .................. A61B 5/0084
600/165
2012/0189183 A1 7/2012 Xue et al.
2020/0281567 A1\* 9/2020 Hristov ................. A61B 8/481

\* cited by examiner

SYSTEMS AND METHODS OF VALIDATING MOTION CORRECTION OF MEDICAL IMAGES FOR QUANTITATIVE PARAMETRIC MAPS

BACKGROUND

The field of the disclosure relates generally to systems and methods of validating motion correction, and more particularly, to systems and methods of validating motion correction of medical images for quantitative parametric maps.

Magnetic resonance imaging (MRI) has proven useful in diagnosis of many diseases. MRI provides detailed images of soft tissues, abnormal tissues such as tumors, and other structures, which cannot be readily imaged by other imaging modalities, such as computed tomography (CT). Further, MRI operates without exposing patients to ionizing radiation experienced in modalities such as CT and x-rays.

Quantitative parametric maps are used to measure biological and pathological properties of the tissue. Parametric maps are derived based on a series of medical images of an anatomy at different points of time. Patient and/or the anatomy moves between the different points of time and therefore motion often deteriorates the quality of estimated parametric maps. Motion correction is commonly used in order to mitigate the problem, but does not always improve the quality of parametric maps.

BRIEF DESCRIPTION

In one aspect, a computer-implemented method of validating motion correction of magnetic resonance (MR) images for a quantitative parametric map of a parameter is provided. The method includes receiving a series of motion corrected images of a series of MR images, wherein the series of MR images are MR images of an anatomical region at different points of time. For each pixel of a plurality of pixels in one of the series of motion corrected images, the method further includes generating a time series at the pixel based on the series of motion corrected images, fitting the time series to a model of the parameter, and estimating an indicator of goodness of fit of the time series to the model. The method also includes generating a metric indicating effectiveness of the motion correction based on estimated indicators of goodness of fit of the plurality of pixels, and validating the motion correction based on the metric.

In another aspect, a motion correction validation system of validating motion correction of MR images for a quantitative parametric map of a parameter is provided. The system includes a motion correction validation computing device. The motion correction validation computing device includes at least one processor in communication with at least one memory device. The at least one processor is programmed to receive a series of motion corrected images of a series of MR images, wherein the series of MR images are MR images of an anatomical region at different points of time. For each pixel of a plurality of pixels in one of the series of motion corrected images, the at least one processor is further programmed to generate a time series at the pixel based on the series of motion corrected images, fit the time series to a model of the parameter, and estimate an indicator of goodness of fit of the time series to the model. The at least one processor is also programmed to generate a metric indicating effectiveness of the motion correction based on estimated indicators of goodness of fit of the plurality of pixels, and validate the motion correction based on the metric.

In one more aspect, a computer-implemented method of validating motion correction of medical images for a quantitative parametric map of a parameter is provided. The method includes receiving a series of motion corrected images of a series of medical images, wherein the series of medical images are medical images of an anatomical region at different points of time. For each pixel of a plurality of pixels in one of the series of motion corrected images, the method further includes generating a time series at the pixel based on the series of motion corrected images, fitting the time series to a model of the parameter, and estimating an indicator of goodness of fit of the time series to the model. The method also includes generating a metric indicating effectiveness of the motion correction based on estimated indicators of goodness of fit of the plurality of pixels, and validating the motion correction based on the metric.

DRAWINGS

The patent or application file includes at least one drawing executed in color. Copies of this patent or patent application publication with color drawing(s) will be provided by the Office upon request and payment of the necessary fee.

DETAILED DESCRIPTION

The disclosure includes systems and methods of validating motion correction of magnetic resonance (MR) images of a subject for quantitative parametric maps. As used herein, a subject is a human, an animal, or a phantom. Method aspects will be in part apparent and in part explicitly discussed in the following description.

In magnetic resonance imaging (MRI), a subject is placed in a magnet. When the subject is in the magnetic field generated by the magnet, magnetic moments of nuclei, such as protons, attempt to align with the magnetic field but precess about the magnetic field in a random order at the nuclei's Larmor frequency. The magnetic field of the magnet is referred to as B0 and extends in the longitudinal or z direction. In acquiring an MRI image, a magnetic field (referred to as an excitation field B1), which is in the x-y plane and near the Larmor frequency, is generated by a radio-frequency (RF) coil and may be used to rotate, or "tip," the net magnetic moment or magnetization Mz of the nuclei from the z direction to the transverse or x-y plane. A signal, which is referred to as an MR signal, is emitted by the nuclei, after the excitation signal B1 is terminated. To use the MR signals to generate an image of a subject, magnetic field gradient pulses (Gx, Gy, and Gz) are used. The gradient pulses are used to scan through the k-space, the space of spatial frequencies or inverse of distances. A Fourier relationship exists between the acquired MR signals and an image of the subject, and therefore the image of the subject can be derived by reconstructing the MR signals.

Figure 1:
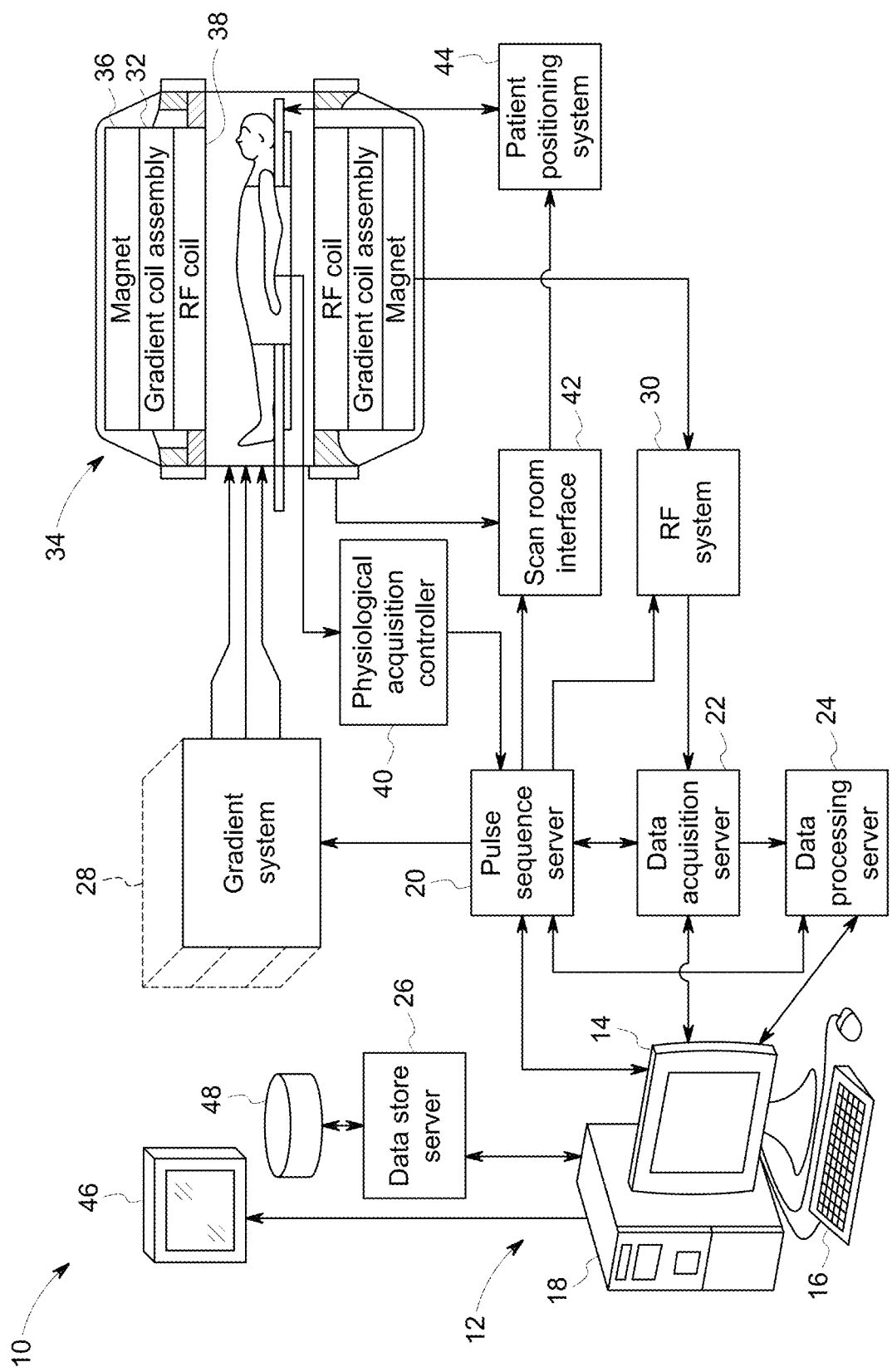
FIG. 1 is a schematic diagram of an exemplary magnetic resonance imaging (MRI) system.

FIG. 1 illustrates a schematic diagram of an exemplary MRI system 10. In the exemplary embodiment, the MRI system 10 includes a workstation 12 having a display 14 and a keyboard 16. The workstation 12 includes a processor 18, such as a commercially available programmable machine running a commercially available operating system. The workstation 12 provides an operator interface that allows scan prescriptions to be entered into the MRI system 10. The workstation 12 is coupled to a pulse sequence server 20, a data acquisition server 22, a data processing server 24, and a data store server 26. The workstation 12 and each server 20, 22, 24, and 26 communicate with each other.

In the exemplary embodiment, the pulse sequence server 20 responds to instructions downloaded from the workstation 12 to operate a gradient system 28 and a radiofrequency ("RF") system 30. The instructions are used to produce gradient and RF waveforms in MR pulse sequences. An RF coil 38 and a gradient coil assembly 32 are used to perform the prescribed MR pulse sequence. The RF coil 38 is shown as a whole body RF coil. The RF coil 38 may also be a local coil that may be placed in proximity to the anatomy to be imaged, or a coil array that includes a plurality of coils.

In the exemplary embodiment, gradient waveforms used to perform the prescribed scan are produced and applied to the gradient system 28, which excites gradient coils in the gradient coil assembly 32 to produce the magnetic field gradients $G_x$, $G_y$, and $G_z$ used for position-encoding MR signals. The gradient coil assembly 32 forms part of a magnet assembly 34 that also includes a polarizing magnet 36 and the RF coil 38.

In the exemplary embodiment, the RF system 30 includes an RF transmitter for producing RF pulses used in MR pulse sequences. The RF transmitter is responsive to the scan prescription and direction from the pulse sequence server 20 to produce RF pulses of a desired frequency, phase, and pulse amplitude waveform. The generated RF pulses may be applied to the RF coil 38 by the RF system 30. Responsive MR signals detected by the RF coil 38 are received by the RF system 30, amplified, demodulated, filtered, and digitized under direction of commands produced by the pulse sequence server 20. The RF coil 38 is described as a transmitter and receiver coil such that the RF coil 38 transmits RF pulses and detects MR signals. In one embodiment, the MRI system 10 may include a transmitter RF coil that transmits RF pulses and a separate receiver coil that detects MR signals. A transmission channel of the RF system 30 may be connected to a RF transmission coil and a receiver channel may be connected to a separate RF receiver coil. Often, the transmission channel is connected to the whole body RF coil 38 and each receiver section is connected to a separate local RF coil.

In the exemplary embodiment, the RF system 30 also includes one or more RF receiver channels. Each RF receiver channel includes an RF amplifier that amplifies the MR signal received by the RF coil 38 to which the channel is connected, and a detector that detects and digitizes the I and Q quadrature components of the received MR signal. The magnitude of the received MR signal may then be determined as the square root of the sum of the squares of the I and Q components as in Eq. (1) below:

$$M = \sqrt{I^2 + Q^2} \quad (1)$$

and the phase of the received MR signal may also be determined as in Eq. (2) below:

$$\varphi = \tan^{-1}\left(\frac{Q}{I}\right). \quad (2)$$

In the exemplary embodiment, the digitized MR signal samples produced by the RF system 30 are received by the data acquisition server 22. The data acquisition server 22 may operate in response to instructions downloaded from the workstation 12 to receive real-time MR data and provide buffer storage such that no data is lost by data overrun. In some scans, the data acquisition server 22 does little more than pass the acquired MR data to the data processing server 24. In scans that need information derived from acquired MR data to control further performance of the scan, however, the data acquisition server 22 is programmed to produce the needed information and convey it to the pulse sequence server 20. For example, during prescans, MR data is acquired and used to calibrate the pulse sequence performed by the pulse sequence server 20. Also, navigator signals may be acquired during a scan and used to adjust the operating parameters of the RF system 30 or the gradient system 28, or to control the view order in which k-space is sampled.

In the exemplary embodiment, the data processing server 24 receives MR data from the data acquisition server 22 and processes it in accordance with instructions downloaded from the workstation 12. Such processing may include, for example, Fourier transformation of raw k-space MR data to produce two or three-dimensional images, the application of filters to a reconstructed image, the performance of a back-projection image reconstruction of acquired MR data, the generation of functional MR images, and the calculation of motion or flow images.

In the exemplary embodiment, images reconstructed by the data processing server 24 are conveyed back to, and stored at, the workstation 12. In some embodiments, real-time images are stored in a database memory cache (not shown in FIG. 1), from which they may be output to operator display 14 or a display 46 that is located near the magnet assembly 34 for use by attending physicians. Batch mode images or selected real time images may be stored in a host database on disc storage 48 or on a cloud. When such images have been reconstructed and transferred to storage, the data processing server 24 notifies the data store server 26. The workstation 12 may be used by an operator to archive the images, produce films, or send the images via a network to other facilities.

In some applications, to study and examine biological and pathological properties of a subject, a series of MR images are used to estimate parameters such as T1 and T2 and derive maps of the parameters or parametric maps. A parametric map indicates the value of the parameter at each location. For example, a T1 map of an anatomical region is an image of the anatomical region with each pixel of the image indicating the T1 value at the location in the anatomical region corresponding to that pixel. T1 values in the T1 maps are useful in examining the biological and pathological properties of the subject, especially the heart muscle. Myocardial T1 is prolonged in most forms of pathology such as edema and chronic cardiac and systemic disorders. Myocardial T1 shortening may be seen in disorders like Fabry disease. Maps of other parameters, such as proton density or diffusion coefficient may be generated.

As discussed above, in MRI, the magnetization M is rotated from the z axis to the x-y plane when an excitation RF pulse is applied. Magnetization may be represented by a vector M having three components Mx, My, and Mz along the three axes of the x, y, z axes. When the RF pulse is turned off, the magnetization M relaxes back to the z axis and the transverse components Mx and My decay because the spin of the nuclei dephases. Simplified equations of the magnetization M after a 90° excitation pulse are:

$$M_z(t) = M_0\left(1 - e^{-\frac{t}{T1}}\right), \quad (3)$$

$$M_\perp(t) = M_0 e^{-\frac{t}{T2}}, \quad (4)$$

where $M_\perp$ is the vector of magnetization M in the transverse plane and includes transverse components Mx and My.

The time for the z component Mz to grow from 0 to (1−1/e), or about 63% of the original magnetization before the excitation is referred to as longitudinal relaxation time T1. The time for the transverse component Mx or My to decay down from 1 to 1/e, about 37% of its initial maximum value immediately after the excitation is referred to as transverse relaxation time T2. In other words, the components of the magnetization M may be approximated with exponential models having time constants of T1 or T2 as expressed in Eqns. (3) and (4).

In deriving parametric maps, a series of MR images across time are used and time series for a plurality of pixels are each fitted to a signal model of the parameter(s) to derive the parameter(s) at the plurality of pixels. The series of MR images are MR images of the same anatomy at different points of time. For a T1 map, an inversion recovery pulse sequence may be used, where the magnetization is inverted to −z axis by an inversion RF pulse and then flipped to the transverse plane by an excitation RF pulse to acquire MR signals after an inversion time between the inversion RF pulse and the excitation RF pulse. A series of MR images with different inversion times are acquired and used for T1 mapping. The series of MR images may be represented as a three-dimensional (3D) dataset, with the third dimension being the time dimension. The series of images may be represented by a four-dimensional (4D) dataset, where the series of images are series of 3D images of an anatomical volume at different points of time and the fourth dimension is time. For each pixel, a time series along the time dimension is used to be fitted to a model for the parameter(s) to be estimated. For a T1 map, a pixel-wise fit of the T1 exponential decay model such as Eqn. (3) is used.

Because the series of images are images of the same anatomical region at different points of time, if the subject moves, the pixels at different points of time do not correspond to the same location in the anatomical region and the parametric maps would be inaccurate. In reality, the subject always moves, as physiological motion like heart beating or breathing or bulk motion. Motion also causes motion artifacts in the images, which further deteriorate the quality of parametric maps. Motion correction is used to align the series of images, which relies on the similarities between the images. Motion correction typically includes three parts of computation of similarity metrics, derivation of motion parameters by optimizing the similarity metrics, and registering the images using the derived motion parameters. A similarity metric between two images indicates how similar the two images are. Exemplary similarity metrics are a root mean square error or mutual information between the two images. Motion parameters, such as translation or rotation parameters, are derived by optimizing their values with respect to the resulting similarity metric. Once the motion parameters are derived, one of the two images is transformed or registered to the other image using the derived motion parameters. Transformation may be rigid or non-rigid/elastic transformation.

In contrast to motion correction, parametric mapping relies on the differences between the images to extract information and to generate estimates of the parameters. That is, the changing contrast properties of the images acquired for parametric mapping impair the performance of the motion correction. Therefore, it is difficult to draw conclusions about the quality of parametric maps based on the similarity metric. Further, inaccurate motion correction may be counter-productive for parametric mapping. A study shows motion correction worsens the accuracy of parametric maps in approximately 12% of cases and significantly worsens the accuracy in approximately 5% cases. Parametric maps with reduced accuracy compromise diagnostic and therapeutic accuracy and effectiveness. Visually examining the images to see if motion correction improves the quality of parametric maps is subjective, time-consuming, and difficult. Therefore, there is a need of an objective or quantitative indicator or metric indicating whether motion correction improves or degrades the quality of the resulting parametric maps.

Systems and methods disclosed herein provide metrics indicating the effectiveness of motion correction for parametric mapping. When motion correction improves the quality of parametric mapping, the motion correction is validated as being effective. On the other hand, when motion correction degrades or deteriorates the quality of parametric mapping, the motion correction is not validated as being effective or indicated as failed. The systems and methods allow a user to decide whether to skip or apply motion correction before parametric maps are generated. The metrics may be incorporated in parametric mapping to automatically determine whether to skip or apply motion correction in generating parametric maps. MR images and T1 mapping are used herein as examples for illustration purposes only. The systems and methods disclosed herein may be applied to other parametric mapping and/or using medical images acquired by other imaging modalities such as computed tomography (CT).

Figure 2A:
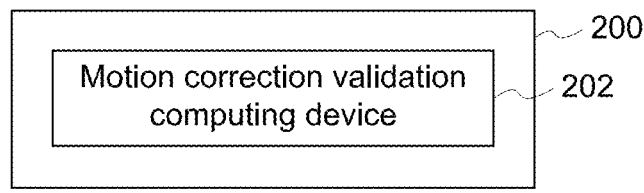
FIG. 2A is an exemplary motion correction validation system.

FIG. 2A is a schematic diagram of an exemplary motion correction validation system 200. In the exemplary embodiment, the system 200 includes a motion correction validation computing device 202 configured to validate motion correction of MR images. The motion correction validation computing device 202 may be included in the workstation 12 of the MRI system 10, or may be included in a separate computing device that is in communication with the workstation 12. In some embodiments, the motion correction validation computing device 202 is a separate computing device from the workstation 12 and receives MR images acquired by the workstation 12 through a portable storage device, such as a flash drive or a thumb drive.

Figure 2B:
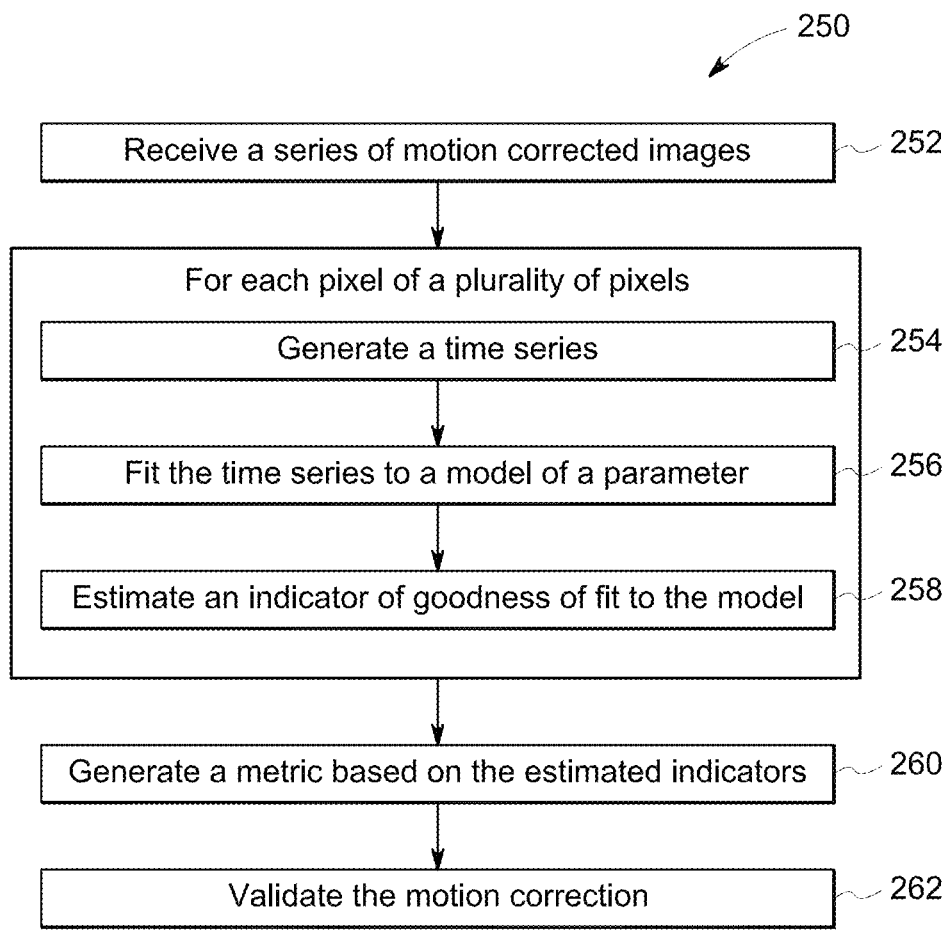
FIG. 2B is a flow chart of an exemplary method of validating motion correction.

FIG. 2B is a flow chart of an exemplary method 250. The method 250 may be implemented on the motion correction validation computing device 202. In the exemplary embodiment, the method includes receiving 252 a series of motion corrected MR images of a series of MR images. The series of MR images are MR images of an anatomical region of a subject at different points of time. The anatomical region may be a region including an anatomical structure such as the heart, brain, liver of the subject, or a part of the phantom. The anatomical structure moves during an MR scan. For example, the heart constantly moves. To capture the motion, depict the heart at different points of time, and/or derive a parametric map, a series of MR images of the heart are acquired at different points of time. Motion corrected MR images are the series of MR images being motion corrected with a motion correction algorithm.

Figure 3:
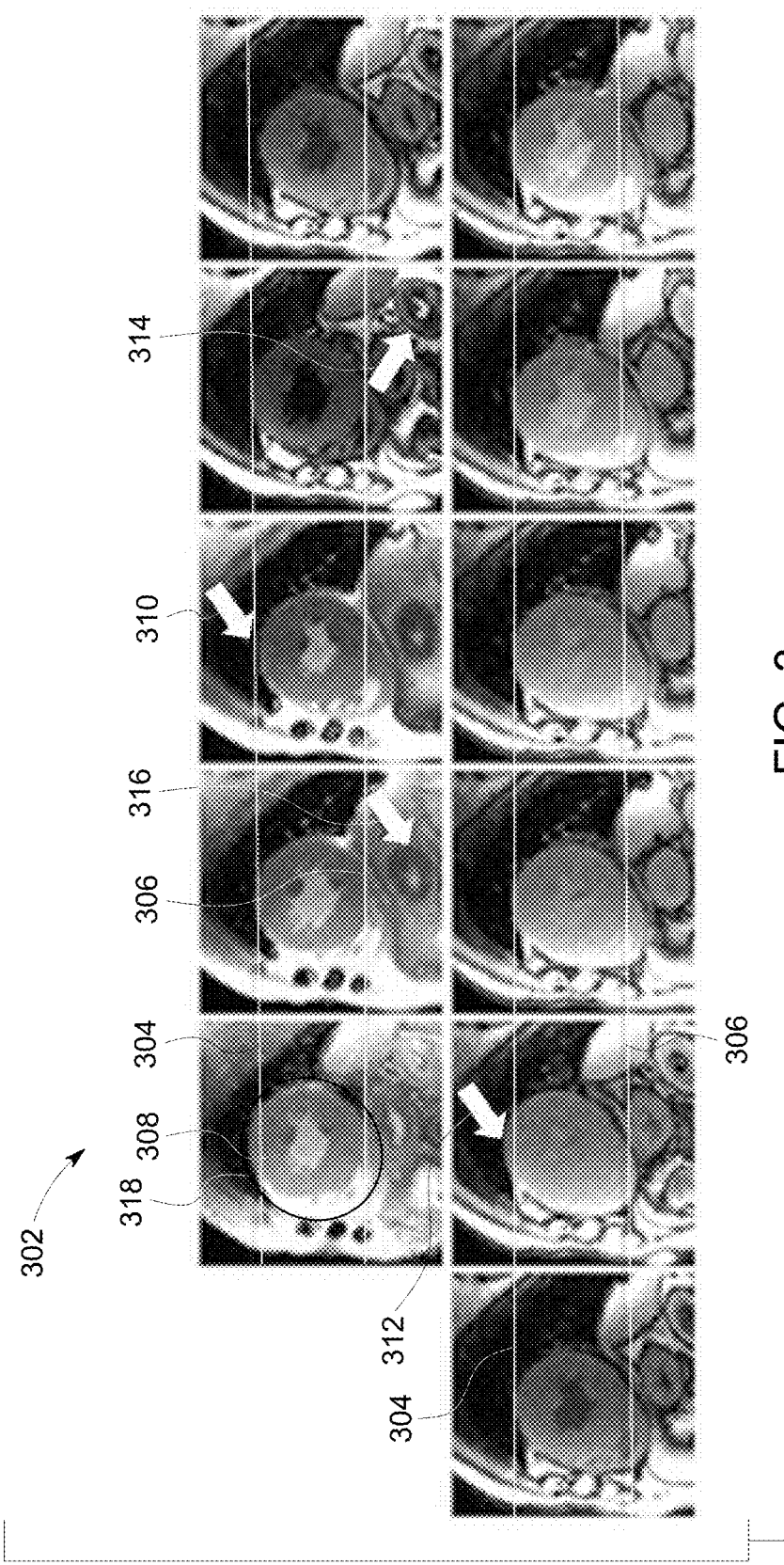
FIG. 3 is a series of cardiac images for T1 mapping.

FIG. 3 shows a series of sagittal MR images 302 of a human heart acquired at different points of time with the same pulse sequence for T1 mapping. The MR images are images of the same sagittal slice of the heart region. Different images in the series are acquired with different TI. If the body does not move, anatomical features in each of the MR images 302 would remain at the same locations. Lines 304, 306 are used to indicate how much the body, especially the heart 308, moves. The periphery of the heart 308, as indicated by arrows 310, 312, moves below or above the lines 304, 306 across time. As the heart 308 expands and contracts, different anatomical structures, as indicated by arrows 314, 316, appear in or out of the images 302.

Referring back to FIG. 2B, the method 250 further includes for each of a plurality of pixels, generating 254 a time series for that pixel based on the series of motion corrected images, fitting 256 the time series to a model of a parameter, and estimating 258 an indicator of goodness of fit of the times series to the model. Like the series of MR images, the series of motion corrected images are images of the same anatomy at different points of time, and may be represented in a 3D or 4D dataset with the third or fourth dimension as the time dimension. A time series for each pixel includes data points at that pixel in the time dimension. As a result, the time series for each pixel is data points of that pixel at the different points of time.

In the exemplary embodiment, this time series is fitted 256 to a model of the parameter to be estimated. For example, for T1 maps, the time series for each pixel is fitted to the model represented by Eqn. (3). An indicator of goodness of fit of the time series to the model is estimated 258. For example, for a T1 map, an indicator of a coefficient of determination ($R^2$) is estimated to indicate how well the time series fits to the model represented by Eqn. (3). $R^2$ may be calculated as:

$$R^2 = 1 - \frac{ss_{res}}{ss_{tot}} = 1 - \frac{\sum_i (y_i - f_i)^2}{\sum_i (y_i - \bar{y})^2}, \quad (5)$$

where $ss_{res}$ is the sum of squares of residuals, $ss_{tot}$ is the total sum of squares, $y_i$ is the data point of the time series at the point of time i, $\bar{y}$ is the mean of the time series, $f_i$ is the fitted data point corresponding to the data point $y_i$. Both the $ss_{res}$ and $ss_{tot}$ are summed across the time points of the time series. Indicators such as model evaluation metrics like a root mean squared error, residual standard error, mean absolute error, adjusted $R^2$, Akaike's information criterion (AIC), AICc (AIC with a correction for small sample sizes), Bayesian information criterion, and Mallows's Cp, or other indicators that allow the method 250 to perform as described herein may be used. Generating 254, fitting 256, and estimating 258 is repeated for each pixel in a plurality of pixels. The plurality of pixels may be all or some of the pixels in one of the series of motion corrected images. In some embodiments, the plurality of pixels are pixels in an ROI in the motion corrected images. An exemplary ROI is a region 318 that covers only the heart (see FIG. 3). Using ROI is advantageous for some applications because as discussed above, some anatomical features (as marked by arrows 316, 314 in FIG. 3) may appear in and out of the series of images, which affect the quality of parametric mapping.

In the exemplary embodiment, the method 250 further includes generating 260 a metric indicating the effect of motion correction based on the estimated indicators of goodness of fit of the plurality of pixels. An exemplary metric is the percentage of pixels among the plurality of pixels having an estimated indicator above a threshold of goodness of fit. For example, the metric is the percentage of pixels having $R^2$ greater than 0.98. In other words, the number of pixels in an anatomical region of clinical interest conforming to the signal evolution model is counted. Misalignment is one of the causes for the nonconformance between the data and the model. Accordingly, the metric indicates the performance of motion correction.

In the exemplary embodiment, the method 250 also includes validating motion correction based on the metric. The metric may be used to infer whether motion correction has worked or failed and the likelihood of the motion correction being effective. The higher the metric is, the more likely the motion correction is effective and improves the quality of parametric mapping. For example, if a large percentage, for example 90%, of pixels in an ROI have indicators of goodness of fit greater than the threshold of goodness of fit, images likely are aligned well and motion correction likely has worked and improved the quality of parametric mapping. On the other hand, if a small percentage of pixels, for example 40%, of pixels have indicators of a goodness of fit greater than the threshold of goodness of fit, images likely are not aligned well and motion correction likely has failed and degraded the quality of parametric mapping. In some embodiments, the metric is compared to a metric threshold and the inference is made based on the comparison. For example, the metric threshold is set as 90%. If greater than 90% of pixels in an ROI have $R^2$ greater than a threshold of goodness of fit, the motion correction likely has worked. If the metric is less than 90%, motion correction likely has failed. Two different metric thresholds may be used for the inference. In one example, the first metric threshold is 90% and the second metric threshold is 60%. If the metric is greater than 90%, motion correction likely has worked. If the metric is less than 60%, motion correction likely has failed. If the metric is between 60% and 90%, motion correction likely has no effect on the alignment. When motion correction is inferred as having failed, a user may be alerted that motion correction has failed and recommended to turn motion correction off in parametric mapping.

In some embodiments, the metrics are used to choose among motion correction algorithms. For example, different motion correction algorithms are used to derive motion correction images and a corresponding metric is estimated for each motion correction algorithm based on the derived motion correction images for that motion correction algorithm. A motion correction algorithm is chosen based on the metrics. For example, if the metric for a motion correction algorithm is above a metric threshold and is the highest, this motion correction algorithm is chosen or the user may be advised to choose this motion correction algorithm. A parametric map may be generated based on the motion corrected images using this motion correction algorithm. In another example, if all metrics are below a metric threshold, motion correction is skipped or a message is provided to the user that the parametric map should be generated without motion correction. In one example, when metrics indicate all motion correction algorithms degrade parametric mapping, motion is likely too severe in the series of MR images and the user is alerted that the images needs to be reacquired.

In some embodiments, validating 262 is automated and incorporated in parametric mapping. When the metric indicates motion correction has failed, motion correction is skipped and the uncorrected images are used in deriving parametric maps. Alternatively, the metrics are used to choose a motion correction algorithm that would improve or best improve parametric mapping. If metrics of all motion correction algorithms indicate motion correction degrades the parametric mapping, parametric maps may be derived with uncorrected images or the user is informed to acquire a new set of images.

Figure 4:
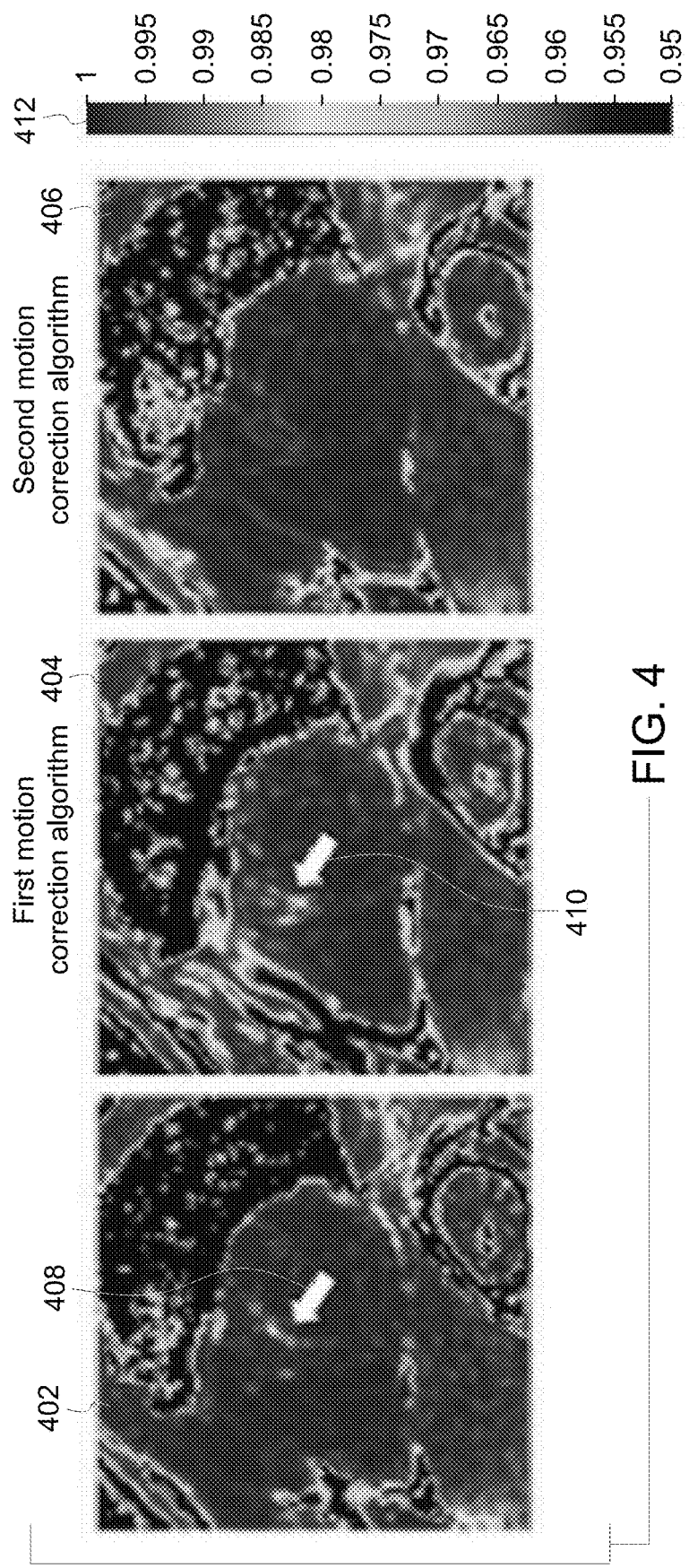
FIG. 4 shows $R^2$ maps of T1 mapping without motion correction, with a first motion correction algorithm, and with a second motion correction algorithm.

In some embodiments, a goodness-of-fit map is generated. FIG. 4 shows exemplary maps 402, 404, 406 of goodness of fit. The maps 402, 404, 406 are maps of $R^2$ in fitting to a T1 model based on the cardiac images 302 (see FIG. 3). A color bar 412 indicates the value of $R^2$, where red indicates $R^2$ is relatively high and blue indicates $R^2$ is relatively low. The map 402 is the $R^2$ map for uncorrected images. The map 404 is the $R^2$ map for motion corrected images with a first motion correction algorithm. The map 406 is the $R^2$ map for motion correction images with a second motion correction algorithm. Arrows 408, 410 indicate pixels having relatively low level of goodness of fit. More pixels in the map 404 have relatively low goodness of fit than maps 402, 406, and more pixels in the map 406 have relatively high goodness of fit than maps 402, 404. Comparing the maps 402, 404, 406, the first motion correction algorithm exacerbates the T1 mapping while the second motion correction algorithm improves the T1 mapping.

Figure 5:
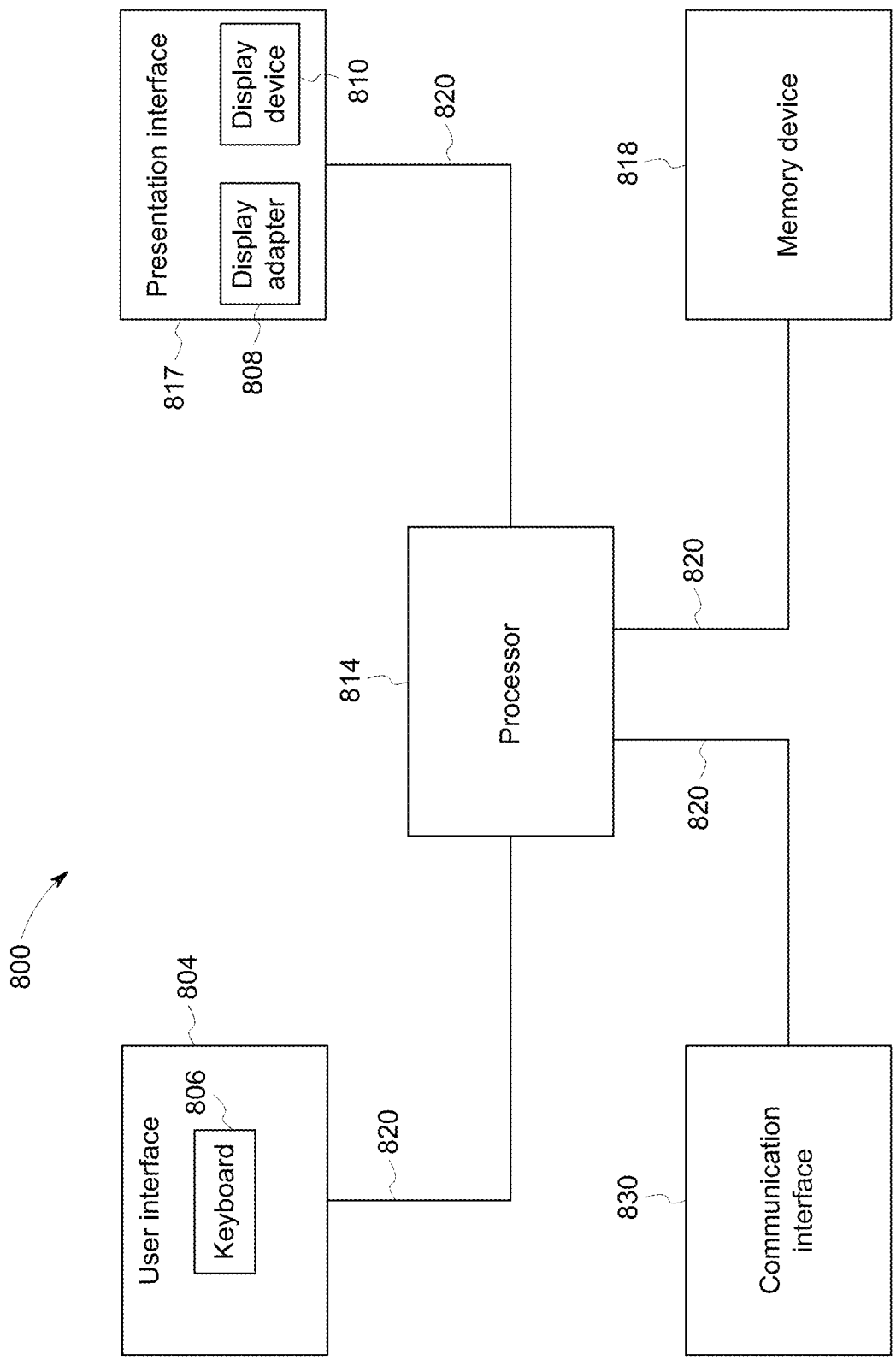
FIG. 5 is a block diagram of an exemplary computing device.

The workstation 12 and the motion correction validation computing device 202 described herein may be any suitable computing device 800 and software implemented therein. FIG. 5 is a block diagram of an exemplary computing device 800. In the exemplary embodiment, the computing device 800 includes a user interface 804 that receives at least one input from a user. The user interface 804 may include a keyboard 806 that enables the user to input pertinent information. The user interface 804 may also include, for example, a pointing device, a mouse, a stylus, a touch sensitive panel (e.g., a touch pad and a touch screen), a gyroscope, an accelerometer, a position detector, and/or an audio input interface (e.g., including a microphone).

Moreover, in the exemplary embodiment, computing device 800 includes a display interface 817 that presents information, such as input events and/or validation results, to the user. The display interface 817 may also include a display adapter 808 that is coupled to at least one display device 810. More specifically, in the exemplary embodiment, the display device 810 may be a visual display device, such as a cathode ray tube (CRT), a liquid crystal display (LCD), a light-emitting diode (LED) display, and/or an "electronic ink" display. Alternatively, the display interface 817 may include an audio output device (e.g., an audio adapter and/or a speaker) and/or a printer.

The computing device 800 also includes a processor 814 and a memory device 818. The processor 814 is coupled to the user interface 804, the display interface 817, and the memory device 818 via a system bus 820. In the exemplary embodiment, the processor 814 communicates with the user, such as by prompting the user via the display interface 817 and/or by receiving user inputs via the user interface 804. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, the memory device 818 includes one or more devices that enable information, such as executable instructions and/or other data, to be stored and retrieved. Moreover, the memory device 818 includes one or more computer readable media, such as, without limitation, dynamic random access memory (DRAM), static random access memory (SRAM), a solid state disk, and/or a hard disk. In the exemplary embodiment, the memory device 818 stores, without limitation, application source code, application object code, configuration data, additional input events, application states, assertion statements, validation results, and/or any other type of data. The computing device 800, in the exemplary embodiment, may also include a communication interface 830 that is coupled to the processor 814 via the system bus 820. Moreover, the communication interface 830 is communicatively coupled to data acquisition devices.

In the exemplary embodiment, the processor 814 may be programmed by encoding an operation using one or more executable instructions and providing the executable instructions in the memory device 818. In the exemplary embodiment, the processor 814 is programmed to select a plurality of measurements that are received from data acquisition devices.

In operation, a computer executes computer-executable instructions embodied in one or more computer-executable components stored on one or more computer-readable media to implement aspects of the invention described and/or illustrated herein. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

At least one technical effect of the systems and methods described herein includes (a) quantitative metrics for indicating whether motion correction has improved parametric mapping; (b) automatic indication of effectiveness of motion correction; and (c) parametric mapping with automatic selection among motion correction algorithms and/or no motion correction.

Exemplary embodiments of systems and methods of motion correction validation are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method of validating motion correction of magnetic resonance (MR) images for a quantitative parametric map of a parameter, comprising:
   receiving a series of motion corrected images of a series of MR images, wherein the series of MR images are MR images of an anatomical region at different points of time;
   for each pixel of a plurality of pixels in one of the series of motion corrected images, the method further comprising:
      generating a time series at the pixel based on the series of motion corrected images;
      fitting the time series to a model of the parameter; and
      estimating an indicator of goodness of fit of the time series to the model;
   generating a metric indicating effectiveness of the motion correction based on estimated indicators of goodness of fit of the plurality of pixels; and
   validating the motion correction based on the metric.

2. The method of claim 1, wherein the metric is a percentage of pixels having the indicator of goodness of fit above a threshold of goodness of fit.

3. The method of claim 1, wherein the indicator of goodness of fit is a coefficient of determination ($R^2$).

4. The method of claim 1, further comprising:
   alerting a user that the motion correction has failed when the metric is below a metric threshold.

5. The method of claim 1, further comprising:
   generating a goodness-of-fit map of the anatomical region based on estimated indicators of goodness of fit.

6. The method of claim 5, wherein generating a goodness-of-fit map further comprises:
   indicating locations of pixels that motion correction has failed.

7. The method of claim 1, wherein:
   if the motion correction is validated as being effective, the method further comprises generating the parametric map based in the series of motion corrected images; and
   if the motion correction is not validated as being effective, the method further comprises generating the parametric map based on the series of MR images.

8. The method of claim 1, further comprising:
   receiving a first series of motion corrected images of the series of MR images and a second series of motion corrected images of the series of MR images, wherein the first series of motion corrected images are motion corrected images of the series of MR images with a first motion correction algorithm, and the second series of the motion corrected images are motion corrected images of the series of MR images with a second motion correction algorithm;
   for each of the plurality of pixels,
      generating a first time series at the pixel based on the first series of motion corrected images;
      fitting the first time series to the model;
      estimating a first indicator of goodness of fit of the first time series to the model;
      generating a second time series at the pixel based on the second series of motion corrected images;
      fitting the second time series to the model; and
      estimating a second indicator of goodness of fit of the second time series to the model;
   generating a first metric based on first indicators and a second metric based on second indicators;
   selecting among the series of MR images, the first series of motion corrected images, and the second series of motion corrected images based on the first metric and the second metric; and
   generating a parametric map using the selected series of images.

9. The method of claim 1, wherein generating a time series further comprises:
   determining a region of interest (ROI) in the series of MR images, wherein the plurality of pixels are pixels in the ROI.

10. A motion correction validation system of validating motion correction of magnetic resonance (MR) images for a quantitative parametric map of a parameter, comprising a motion correction validation computing device, the motion correction validation computing device comprising at least one processor in communication with at least one memory device, and the at least one processor programmed to:
   receive a series of motion corrected images of a series of MR images, wherein the series of MR images are MR images of an anatomical region at different points of time;
   for each pixel of a plurality of pixels in one of the series of motion corrected images, the at least one processor programmed to:
      generate a time series at the pixel based on the series of motion corrected images;
      fit the time series to a model of the parameter; and
      estimate an indicator of goodness of fit of the time series to the model;
   generate a metric indicating effectiveness of the motion correction based on estimated indicators of goodness of fit of the plurality of pixels; and
   validate the motion correction based on the metric.

11. The system of claim 10, wherein the metric is a percentage of pixels having the indicator of goodness of fit above a threshold of goodness of fit.

12. The system of claim 10, wherein the indicator of goodness of fit is a coefficient of determination ($R^2$).

13. The system of claim 10, wherein the at least one processor is further programmed to:
   alert a user that the motion correction has failed when the metric is below a metric threshold.

14. The system of claim 10, wherein the at least one processor is further programmed to:
   generate a goodness-of-fit map of the anatomical region based on estimated indicators of goodness of fit.

15. The system of claim 14, wherein the at least one processor is further programmed to:
   indicate locations of pixels that motion correction has failed.

16. The system of claim 10, wherein:
if the motion correction is validated as being effective, the at least one processor is further programmed to generate the parametric map based in the series of motion corrected images; and
if the motion correction is not validated as being effective, the at least one processor is further programmed to generate the parametric map based on the series of MR images.

17. The system of claim 10, wherein the at least one processor is further programmed to:
receive a first series of motion corrected images of the series of MR images and a second series of motion corrected images of the series of MR images, wherein the first series of motion corrected images are motion corrected images of the series of MR images with a first motion correction algorithm, and the second series of the motion corrected images are motion corrected images of the series of MR images with a second motion correction algorithm;
for each of the plurality of pixels,
  generate a first time series at the pixel based on the first series of motion corrected images;
  fit the first time series to the model;
  estimate a first indicator of goodness of fit of the first time series to the model;
  generate a second time series at the pixel based on the second series of motion corrected images;
  fit the second time series to the model; and
  estimate a second indicator of goodness of fit of the second time series to the model;
generate a first metric based on first indicators and a second metric based on second indicators;
select among the series of MR images, the first series of motion corrected images, and the second series of motion corrected images based on the first metric and the second metric; and
generate a parametric map using the selected series of images.

18. A computer-implemented method of validating motion correction of medical images for a quantitative parametric map of a parameter, comprising:
receiving a series of motion corrected images of a series of medical images, wherein the series of medical images are medical images of an anatomical region at different points of time;
for each pixel of a plurality of pixels in one of the series of motion corrected images, the method further comprising:
  generating a time series at the pixel based on the series of motion corrected images;
  fitting the time series to a model of the parameter; and
  estimating an indicator of goodness of fit of the time series to the model;
generating a metric indicating effectiveness of the motion correction based on estimated indicators of goodness of fit of the plurality of pixels; and
validating the motion correction based on the metric.

19. The method of claim 18, wherein the metric is a percentage of pixels having the indicator of goodness of fit above a threshold of goodness of fit.

20. The method of claim 18, wherein:
if the motion correction is validated as being effective, the method further comprises generating the parametric map based in the series of motion corrected images; and
if the motion correction is not validated as being effective, the method further comprises generating the parametric map based on the series of medical images.

* * * * *